Oct. 31, 1961   R. BINDER   3,006,449
CENTRIFUGAL CLUTCH WITH ROLLER-TYPE FLYWEIGHTS
Filed Feb. 14, 1958   3 Sheets-Sheet 1
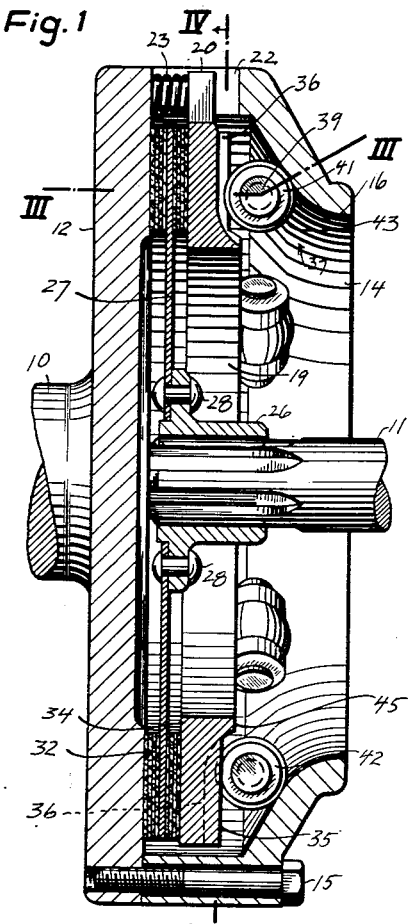
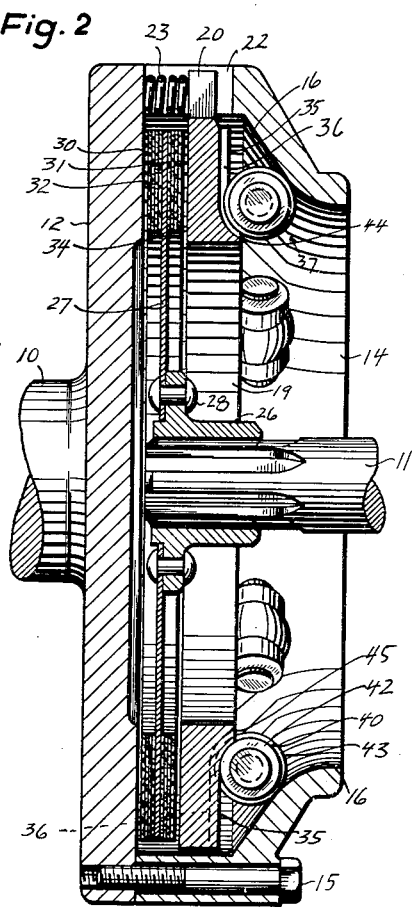
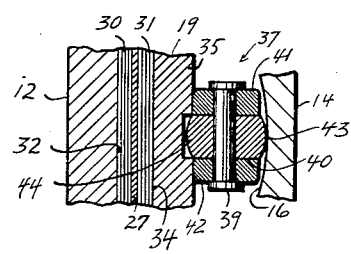
INVENTOR:
RICHARD BINDER Oct. 31, 1961   R. BINDER   3,006,449
CENTRIFUGAL CLUTCH WITH ROLLER-TYPE FLYWEIGHTS
Filed Feb. 14, 1958   3 Sheets-Sheet 3

INVENTOR:
RICHARD BINDER

United States Patent Office 3,006,449
Patented Oct. 31, 1961

3,006,449
CENTRIFUGAL CLUTCH WITH ROLLER-TYPE FLYWEIGHTS

Richard Binder, Schweinfurt am Main, Germany, assignor to Fichtel & Sachs A.G., Schweinfurt am Main, Germany, a corporation of Germany
Filed Feb. 14, 1958, Ser. No. 715,388
Claims priority, application Germany Feb. 16, 1957
1 Claim. (Cl. 192—105)

The present invention relates to centrifugal clutches of a type suitable for use in motor vehicles, and more particularly to certain improvements therein which provide for unusually smooth engagement of the clutch combined with great sensitivity of response to changes in engine speed.

A principal feature of the invention, involves the use of centrifugal flyweights which are formed as radially guided rollers so that actuating friction involved in engagement and disengagement of the clutch is minimized.

Additionally, the use of roller-type flyweights provides for simplicity and compactness of construction and long wear with a minimum of maintenance.

In a preferred embodiment of the invention, the clutch comprises a driving member which may also be the engine flywheel, a circular housing which is secured to the driving member, an axially movable pressure plate connected for rotation with the driving member, and a driven member provided with friction linings which are sandwiched between confronting friction faces formed on the driving member and the pressure plate. Between the annular housing and the outer side of the pressure plate which faces away from its friction face, there is disposed a series of roller-type flyweights. The inner end face of the housing and the outer face of the pressure plate confront each other and converge radially outwardly, the rollers being guided by radially extending grooves formed in the outer side of the pressure plate.

A control surface is formed on the inner end face of the housing, the control surface being shaped as a smooth continuous 360° surface of revolution concentric with the common axis of rotation of the driving and driven members. In response to increasing engine speed and the accompanying increasing centrifugal force acting on the rollers, the rollers are urged outwardly to become wedged between the housing and the pressure plate with increasing force and thus force the pressure plate toward the driving member so that the friction linings of the driven member are pressed with increasing force between the friction faces of the driving member and the pressure plate. The inner end of each groove is curved outwardly to the flat surface of the pressure plate. Inward movement of each roller member is limited by simultaneous engagement of the roller member with the inner end of the groove and the control surface.

The invention will be better understood from the following specification, reference being had to the accompanying drawing forming a part hereof.

In the drawing:

FIGURE 1 is a view in axial section showing a clutch in accordance with the invention in its engaged condition.

FIGURE 2 is a view similar to FIG. 1, except showing the clutch in its disengaged condition.

FIGURE 3 is a fragmentary sectional view taken along the line III—III of FIG. 1, and showing one of the roller-type flyweights in engagement with the housing and the pressure plate.

Referring to FIG. 1, there is a driving shaft 10 which may extend to an internal combustion engine or other prime mover (not shown). There is also a driven shaft 11 which is coaxially aligned with the driving shaft 10 and which is connected through the clutch to the driving shaft 10 when the clutch is engaged. Fixed to the right hand end of the driving shaft 10 is a driving member 12 which, if the driving shaft 10 also forms the crankshaft of an internal combustion engine, may serve as the flywheel of the engine.

Figure 4:
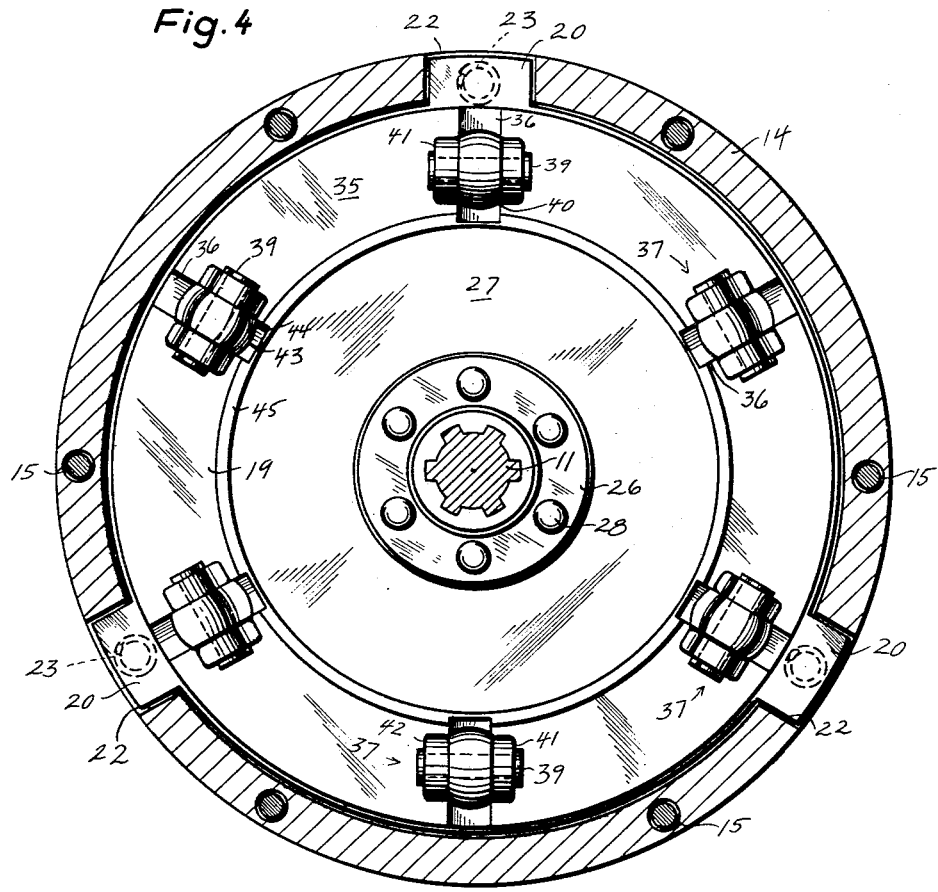
FIGURE 4 is a transverse sectional view taken along the line IV—IV of FIG. 1, looking in the direction of the arrows.
Figure 5:
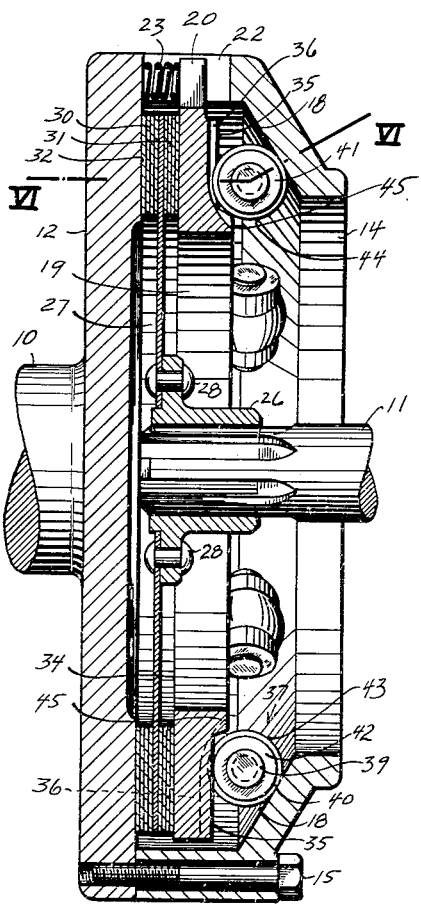
FIGURE 5 is a view similar to FIG. 1, the housing being modified to provide a frusto-conical control surface which cooperates with the roller-type flyweights.
Figure 6:
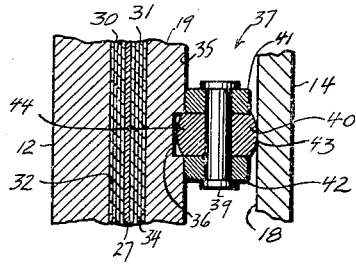
FIGURE 6 is a fragmentary sectional view taken along the line VI—VI of FIG. 5.

A circular housing 14 is secured to the driving member 12 by a circularly arranged series of bolts 15. The inner end surface 16 of the housing, as shown in FIGS. 1 and 2, constitutes a control surface in the shape of a surface of revolution generated with reference to the common axis of the input and output shafts 10 and 11. The generatrix of the control surface 16, is a line lying in a plane passing through the common axis of the driving and driven shafts 10 and 11, respectively. In FIGS. 1 and 2 the generatrix is a curve of which the radius of curvature increases progressively proceeding radially outwardly from the driven shaft 11. In FIG. 5 however, the generatrix is a straight line and the resulting control surface 18 is frusto-conical in shape. The action of these control surfaces and the effect of different configurations therefor is described in greater detail below.

Disposed within the housing 14 is a pressure plate 19. The pressure plate 19 is shown provided with three radially projecting ears 20 which are freely axially slidably received in complementary recesses 22 formed in the lateral wall of the housing 14. The pressure plate 19 is thus freely movable axially but is constrained to rotate with the housing 14 and the driving member 12. The pressure plate 19 is yieldingly biased toward the right, as viewed in the drawing, by a series of helical compression springs 23. Each of the compression springs 23 extends between the driving member 12 and one of the ears 20 of the pressure plate 19.

A hub 26 is keyed or splined on the driven shaft 11. A flat disc-shaped driven member 27 is secured to the hub 26 by a series of rivets 28. At its periphery, the driven disc member 27 is provided with flat annular friction facings 30 and 31 disposed on opposite sides of the driven disc member 27 and suitably secured thereto. A smooth friction surface 32 is formed on the right hand or inner face of the driving member 12 for driving engagement with the friction facing 30 carried by the driven disc member 27. Similarly, a smooth friction surface 34 is formed on the left or inner face of the pressure plate 19 for driving engagement with the other friction facing 31 carried by the driven disc member 27. The compression springs 23, however, urge the pressure plate 19 toward the right so that the friction facings 30 and 31 are normally disengaged from the friction surfaces 32 and 34, respectively and the driving shaft 10 may rotate freely without transmitting any torque to the driven shaft 11.

The right hand or outer face 35 of the pressure plate 19 is flat. A series of regularly angularly spaced radially extending rectilinear grooves 36 are formed in this flat outer face of the pressure plate 19. A roller-type flyweight designated generally as 37 is associated with each of the grooves 36.

Each roller-type flyweight 37 comprises a shaft 39, headed at its ends, on which there are freely revolubly disposed a tun-shaped central roller 40 flanked by two lateral rollers 41 and 42. Each central roller 40 is of greater diameter than its associated lateral rollers 41 and 42. The central roller 40 extends into and is guided by one of the radial grooves 36. The peripheries of the lateral rollers 41 and 42 are cylindrical so that they roll radially in engagement with the flat surface 35 of the pressure plate 19 at opposite sides of each guide groove 36. The periphery of the central roller 40, however, is curved, when viewed in radial section with a curvature the radius of which is smaller than the minimum radius of curvature of the portion of the control surface engageable thereby as viewed in a sectional plane perpendicular to the common rotational axis of the driving and driven members 12 and 27, respectively. This provides rolling line contact between the central roller 40 and the control surface 16 along a path defined by the generatrix of the control surface 16. The inner end of each groove 36 is curved outwardly to the flat outer face 35 of the pressure plate 19 to form an arcuate lip 45. Inward radial movement of each flyweight 37 is limited by simultaneous engagement of the central roller 40 with the control surface 16 and the lip 45. As a result, the central rollers 40 move radially outwardly along the control surface 16 or 18 of the housing 14 and force the pressure plate 19 toward the left, whereby the friction facings 30 and 31 of the driven disc 27 are pressed with increasing force between the confronting friction surfaces 32 and 34 of the driving member and pressure plate 19, respectively.

In FIG. 1, the shape of the line of contact between each central roller 40 and the control surface 16 of the housing 14 is curved so that initial radial outward movement of each flyweight 37 produces a greater clutch engaging displacement of the pressure plate 19 than subsequent radial movement of each flyweight. In FIG. 5, however, this line of contact is rectilinear. As a result, in FIG. 5, the frusto-conical control surface 18 causes the speed of clutch engagement to be the same as the speed of clutch disengagement.

What are believed to be the best embodiments of the invention have been specifically shown and described by way of illustration. It will be apparent to those skilled in the art, however, that various modifications may be made therein without departing from the spirit and scope of the invention as defined in the appended claim.

What is claimed is:

A centrifugal clutch, comprising in combination, a revoluble driving member; a revoluble driven member, said driving and driven members having a common axis of rotation; a housing rigidly connected to said driving member; an axially displaceable pressure plate disposed within said housing for rotation therewith, said pressure plate having a flat surface facing an inner end portion of said housing, said driven member having a pair of friction surfaces on opposite sides thereof disposed for engagement with said pressure plate and driving member upon axial displacement of said pressure plate is one direction; spring means yieldingly urging said pressure plate in the opposite direction; said flat surface having a plurality of symmetrically arranged radially outwardly extending grooves formed therein, said inner end surface of said housing having a control surface formed thereon which is shaped as a smooth continuous 360° surface of revolution concentric with said common axis of rotation, the spacing between said control surface and said flat surface decreasing progressively proceeding outwardly from said common axis, and a plurality of roller members each freely movable along one of said grooves in engagement with said flat surface, the inner end of each groove being curved outwardly to said flat surface, simultaneous engagement by said roller member with the end of said groove and said control surface limiting inward movement of said roller member toward said common axis, the outermost periphery of said roller member being curved, when viewed in radial section, with a curvature the radius of which is smaller than the minimum radius of curvature of the portion of the control surface engageable thereby as viewed on a plane perpendicular to said common axis, whereby said roller member engages said control surface with rolling line contact along a line defined by a generatrix of said surface of revolution, radial outward movement of said roller members forcing said pressure plate in said one direction to cause engagement of said clutch.

References Cited in the file of this patent

UNITED STATES PATENTS

| 834,499 | Sturtevant et al. | Oct. 30, 1906 |
| 2,196,475 | Reed | Apr. 9, 1940 |
| 2,496,201 | Dodge | Jan. 31, 1950 |
| 2,721,639 | Miller | Oct. 25, 1955 |
| 2,902,129 | Reed | Sept. 1, 1959 |

FOREIGN PATENTS

| 1,016,348 | France | Oct. 27, 1952 |